United States Patent [19]

Kiefer

[11] 4,191,520

[45] Mar. 4, 1980

[54] SEALING ARRANGEMENT FOR A MOLDING APPARATUS

[75] Inventor: Günther Kiefer, Schwaigern, Fed. Rep. of Germany

[73] Assignee: Adolf Illig Maschinenbau GmbH & Co., Heilbronn, Fed. Rep. of Germany

[21] Appl. No.: 896,436

[22] Filed: Apr. 13, 1978

[30] Foreign Application Priority Data

Apr. 15, 1977 [DE] Fed. Rep. of Germany ....... 2716680

[51] Int. Cl.² .............................................. B29C 17/04
[52] U.S. Cl. .................. 425/387.1; 264/500; 425/405 R
[58] Field of Search ............... 425/292, 387.1, 403.1; 264/88, 93, 334

[56] References Cited

U.S. PATENT DOCUMENTS

| 3,172,159 | 3/1965 | Edwards | 264/93 X |
| 3,173,174 | 3/1965 | Edwards | 425/292 |
| 3,193,599 | 7/1965 | Crilly | 264/93 |
| 3,218,379 | 11/1965 | Edwards | 264/93 |
| 3,802,819 | 4/1974 | Alroy et al. | 425/292 X |
| 3,832,102 | 8/1974 | Alroy | 425/387.1 X |
| 3,933,562 | 1/1976 | Cruckshank et al. | 425/387.1 X |

FOREIGN PATENT DOCUMENTS

| 2517981 | 11/1976 | Fed. Rep. of Germany | 425/292 |
| 706805 | 4/1954 | United Kingdom | 264/334 |

*Primary Examiner*—Philip Anderson
*Attorney, Agent, or Firm*—Spencer & Kaye

[57] ABSTRACT

An apparatus for forming articles of sheet material includes a chamber; a mold arranged in the chamber; a feeding device for intermittently advancing the sheet material into the chamber; a discharge opening in the chamber for removing therethrough the articles formed in the mold; a slide movable across the chamber and having an advanced position in which it closes the discharge opening and a withdrawn position in which it opens the discharge opening; a pressurizing device for generating a fluid pressure in the chamber in the advanced position of the slide for urging the sheet material into the mold; an arrangement for discharging the formed article from the chamber through the discharge opening in the withdrawn position of the slide; a piston movably received in the chamber for displacement towards and away from the discharge opening to assume an advanced and a withdrawn position, respectively; a seal carried on an end face of the piston oriented towards the slide; and an arrangement for moving the piston into its advanced position for urging the piston with the seal into sealing engagement with the slide for sealing the chamber with respect to the discharge opening.

7 Claims, 4 Drawing Figures

SEALING ARRANGEMENT FOR A MOLDING APPARATUS

BACKGROUND OF THE INVENTION

This invention relates to an apparatus for forming, stamping and stacking (discharging) articles made of a thermoplastic sheet material, wherein all three operational steps are performed in a single station, hereafter referred to as the forming station. Prior to its admission to the forming station, the thermoplastic sheet is heated and then it is intermittently advanced into the forming station. A forming tool secured to a height-adjustable platform is arranged in the forming station. Above the forming tool there is arranged a stacking shaft into which the formed articles are admitted subsequent to their separation from the sheet.

An apparatus of the above-outlined type is disclosed in German Laid-Open Application (Offenlegungsschrift) No. 2,517,981. The apparatus described therein shapes the articles by pressurized air and provides for an intermittent displacement of the stacking shafts and the pressure hood. Such an apparatus is structurally complex and expensive since relatively large masses have to be moved with high frequency (approximately forty times per minute). For this reason it has already been proposed to arrange the stacking shafts stationarily and to introduce a slide intermittently between the stacking shafts and the molds. In this manner a closed space (chamber) is formed which communicates with the other tool parts into which the pressurized article-forming air may be introduced.

In the above-outlined arrangement, however, difficulties have been encountered to effect a seal around the slide for keeping the pressurized air within the chamber closed by the slide. To improve such a seal, it has been attempted to use a rubber-coated slide. Wear, however, occured rapidly, resulting in a deterioration of the sealing properties.

SUMMARY OF THE INVENTION

It is an object of the invention to provide an apparatus of the above-outlined type in which the sealing of the slide is significantly improved, particularly to improve its operational reliability and to prolong its service life.

This object and others to become apparent as the specification progresses, are accomplished by the invention, according to which, briefly stated, the apparatus for forming articles of sheet material includes a chamber; a mold arranged in the chamber; a feeding device for intermittently advancing the sheet material into the chamber; a discharge opening in the chamber for removing therethrough the articles formed in the mold; a slide movable across the chamber and having an advanced position in which it closes the discharge opening and a withdrawn position in which it opens the discharge opening; a pressurizing device for generating a fluid pressure in the chamber in the advanced position of the slide for urging the sheet material into the mold; an arrangement for discharging the formed article from the chamber through the discharge opening in the withdrawn position of the slide; a piston movably received in the chamber for displacement towards and away from the discharge opening to assume an advanced and a withdrawn position, respectively; a seal carried on an end face of the piston oriented towards the slide; and an arrangement for moving the piston into its advanced position and for urging the piston with the seal into sealing engagement with the slide for sealing the chamber with respect to the discharge opening.

Advantageously, all around between the piston and a centrally apertured intermediate plate which bounds the chamber, there extends an annular space to ensure a uniform distribution of the introduced pressurized air and to further ensure that the piston is brought into uniform engagement with the slide.

DESCRIPTION OF THE PREFERRED EMBODIMENT

Figure 1:
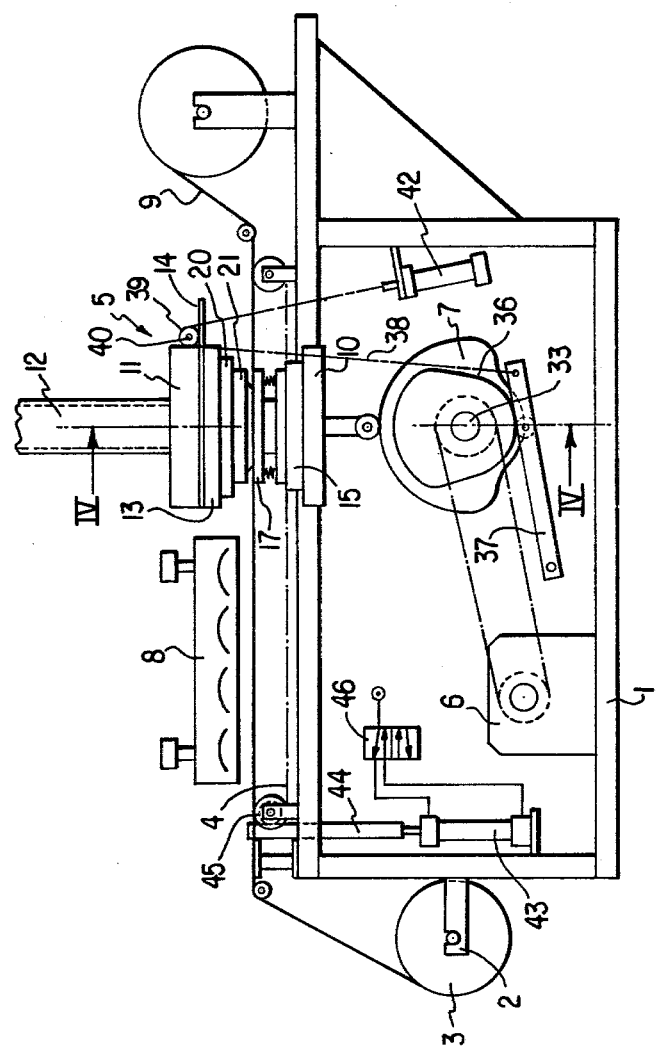
FIG. 1 is a schematic side elevational view of the apparatus incorporating a preferred embodiment of the invention.

Turning now to FIG. 1, the apparatus shown therein comprises a machine frame 1, a bracket 2 for supporting a supply roll 3 of sheet material and a feeding device 4 for the intermittent advance of a sheet portion into a forming station 5, powered by a cam drive 6, 7. The apparatus further includes a heater 8 arranged upstream of the forming station 5 as viewed in the direction of sheet advance. The scrap web 9 is wound into a roll or, instead, it may be directly fed into a comminuting device.

Figure 2:
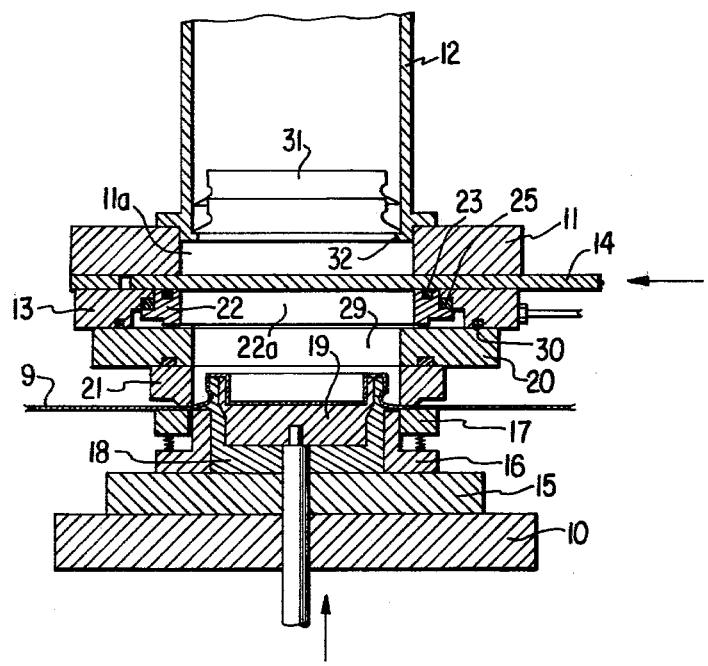
FIG. 2 is an enlarged sectional elevational view of one part of the structure shown in FIG. 1.

Turning now to FIG. 2, the forming station 5 has a vertically movable platform 10 as well as a stationary bridge 11 which defines an article discharge opening 11a and on which there is mounted a stacking shaft 12 in alignment with the discharge opening 11a. To the bridge 11 there is secured an intermediate plate 13 having a central opening. A slide 14 is movably arranged between the intermediate plate 13 and the bridge 11 for alternatingly assuming—as a function of a timed control—an advanced position in which it closes the discharge opening 11a and a withdrawn position in which it opens the discharge opening 11a.

To the platform 10 there is secured the lower portion of a forming tool constituted by a baseplate 15, a stamping member 16, a stripper 17 and a divided mold which has an outer mold part 18 and an inner mold part 19. The upper portion of the forming tool comprising a headplate 20 and a matrix 21 is secured to the intermediate plate 13.

Figure 3:
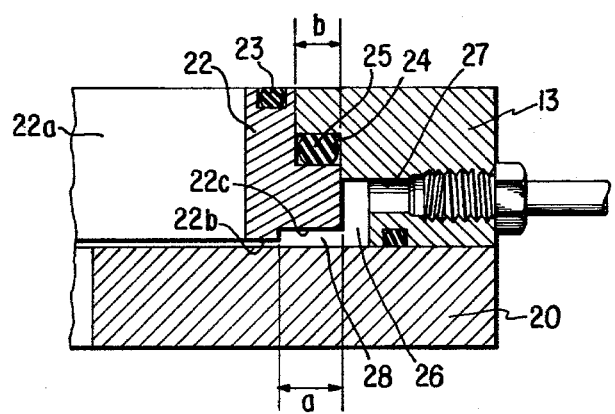
FIG. 3 is an enlarged sectional elevational view of a detail of the structure shown in FIG. 2.

Also referring to FIG. 3, according to the invention, a piston 22 is arranged in the central opening of the intermediate plate 13 under the slide 14. The piston 22 has a central opening 22a and is vertically movable within narrow limits (for example, a few tenths of 1 mm), while it is guided by the plate wall defining the central opening. The piston 22 carries a sealing element 23 at that end face which is oriented towards the slide 14. The sealing element 23 may be an O-ring as shown, or may have any other desired configuration.

In an annular chamber 24 defined by the intermediate plate 13 and the piston 22 there is provided a further sealing element 25 which ensures a secure seal between these two components at least when the piston 22 is in a raised position as will be described below.

The intermediate plate 13, the headplate 20 and the piston 22 define an annular chamber 26 into which pressurized forming air may be introduced through a port 27. At its lower side the piston 22 has a free recess 28 so that the piston 22 engages the headplate 20 only along a narrow surface 22b. The recess 28 is bounded by a piston workface 22c axially spaced from the chamber 24 and oriented away from the discharge opening 11a. The radially measured width a of the workface 22c is greater than the width b of the chamber 24. The aligned central openings of the components 11, 20, 21 and 22 define a pressure chamber 29 bounded by the discharge opening 11a which, in turn, is controlled by the slide 14.

In the description that follows, the operation of the above-described apparatus will be set forth.

The feeding device 4 pulls the sheet material off the supply reel 3 and advances it intermittently in a timed sequence to the forming station 5. Prior to the introduction into the forming station 5, the sheet portion is heated to the necessary forming temperature by the heater 8. In the forming station 5 the platform 10 is raised by the cam drive 6 and 7 and the heated sheet portion is clamped between the stripper 17 and the matrix 21. At the same time the slide 14 is moved into its position shown in FIG. 2.

Subsequently, pressurized air is introduced through the port 27. The pressurized air first fills the annular chamber 26 and the recess 28. Since the recess 28 is wider (dimension a) than the width of the chamber 24 (dimension b), the built-up pressure causes the piston to be lifted from its withdrawn position, in which it engages the headplate 20, into its advanced position in which it is pressed, with the sealing element 23, against the slide 14. The sealing element 23 ensures airtightness between the slide 14 and the piston 22. The additional sealing element 25 prevents the pressurized air from escaping between the intermediate plate 13, the piston 22 and the slide 14.

By lifting the piston 22 there is obtained, between the piston 22 and the headplate 20, a clearance through which pressurized air flows into the pressure chamber (forming chamber) 29 and presses the sheet portion against the molds 18, 19. The forming chamber 29 is hermetically closed all around; such a sealing effect may be further enhanced by additional sealing elements 30 provided between the headplate 20 and the intermediate plate 13 as well as between the headplate 20 and the matrix 21.

After a short dwelling period for cooling the shaped article which is a plastic lid in this example, the pressure chamber 29 is depressurized and the platform 10 is slightly raised whereby the article 31 is stamped by means of the cooperation between the stamping member 16 and the matrix 21. At the same time, the slide 14 is withdrawn and the inner mold 19 is raised. The latter carries with it the formed article 31 and transfers it through the discharge opening 11a to the stacking shaft 12, where the article 31 is held by detents 32 after the inner mold 19 and the platform 10 have returned to their earlier position. After opening the forming tool, the above-described operational cycle is repeated.

Subsequent to the depressurization of the forming chamber 29 and before withdrawing the slide 14, the piston 22 drops by gravity into its earlier, withdrawn position, whereby a clearance between the piston 22 and the slide 14 in the order of magnitude of a few tenths of 1 mm is formed. This clearance is sufficient to ensure that no friction is generated between the seal 23 and the slide 14 as the latter is being withdrawn. It is noted that no contact between the seal 23 and the slide 14 takes place even during the movement of the latter into its advanced position, since at that time the piston 22 is still in its lower, withdrawn position which may be determined by abutments (not shown). By virtue of this arrangement there are ensured a minimum wear and a long service life of reliable seals.

The invention is described and illustrated in connection with the manufacture of a simple article. In practice, usually a plurality of molds are positioned next to one another transversely to the direction of advance of the sheet or even juxtapositioned in a direction parallel to the sheet feed. In such cases the piston 22 is dimensioned in accordance with the greatest surface of the mold in the apparatus and thus has usually a rectangular configuration.

Figure 4:
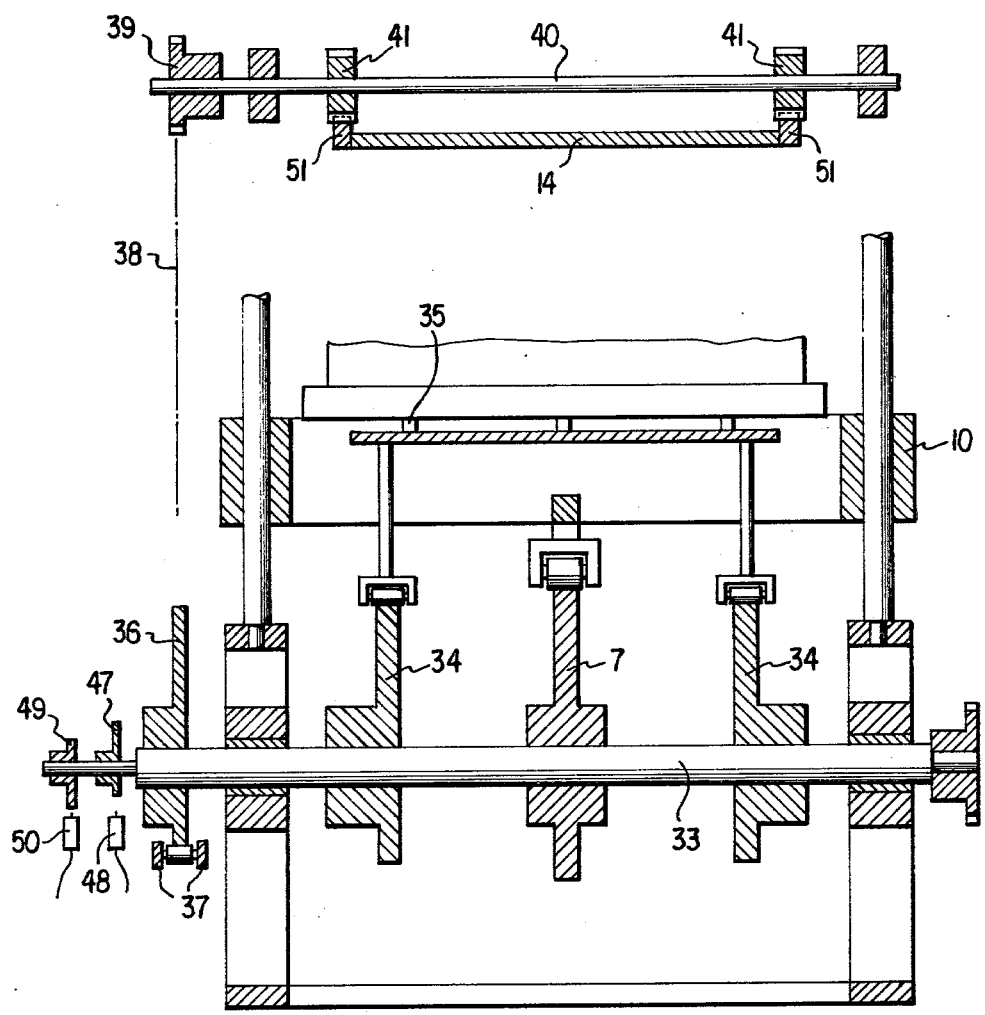
FIG. 4 is a schematic sectional view taken along line IV—IV of FIG. 1.

Turning once again to FIG. 1 and also referred to FIG. 4, the sequence and the individual functions of the apparatus are controlled by the main shaft 33. The main shaft 33 is continuously rotated by a drive 6 with an adjustable number of revolution for setting the number of cycles of the apparatus. To the main shaft 33 the stroke cam 7 is fixed, moving the table 10 up and down. In this manner a closing and opening of the forming tool and a stroke to punch out the formed articles 31 are effected. Furthermore, stroke cams 34 are affixed to the main shaft to lift the mold 19 by lifting the bolts 35.

A cam disc 36 which is also connected with the main shaft 33 swings the lever 37, to which the chain 38 is attached. The chain 38 runs via a chain wheel 39 on a shaft 40, supported by the bridge 11. Two gears 41 are arranged on the shaft 40, meshing with racks 51 secured to the slide 14. The chain 38 is also attached to the piston rod of the cylinder 42, which effects the return motion of the slide 14. The transport chains of the feeding device 4 are moved cyclically by means of a pneumatic cylinder 43 when the forming tool is open. For this purpose the cylinder 43 actuates a rack 44, which is meshing with a gear on the shaft 45.

A switch clutch insures that only one advance movement of the sheet web is effected; when rack 44 returns, the gear is running idle on shaft 45.

Release of control signal to actuate a solenoid valve 46, coupled to cylinder 43, depends on the position of the cam discs 7, 34. For this purpose a control cam 47 is fixed to the main shaft 33, actuating an inductive button 48. This signal actuates the valve 46. Another control cam 49 and an inductive button 50 actuates the compressed air to form the article 31. This connection of switching operations insures repeatability of sequence.

It is to be understood that the above description of the present invention is susceptible to various modifications, changes and adaptations, and the same are intended to be comprehended within the meaning and range of equivalents of the appended claims.

What is claimed is:

1. In an apparatus for forming articles of sheet material, including means defining a pressure chamber; a mold arranged in the pressure chamber; feeding means for intermittently advancing the sheet material into the pressure chamber; means defining a discharge opening in the pressure chamber for removing therethrough the articles formed in the mold; a slide movable across the pressure chamber and having an advanced position in which it closes the discharge opening and a withdrawn position in which it opens the discharge opening; pressurizing means for generating a fluid pressure in the pressure chamber in the advanced position of the slide for urging the sheet material into the mold; and discharge means for removing the formed article from the pressure chamber through the discharge opening in the withdrawn position of the slide; the improvement comprising
- (a) a piston movably received in said chamber for displacement towards and away from said discharge opening; said piston having an advanced position and a withdrawn position;
- (b) a sealing means carried on an end face of said piston oriented towards said slide; and
- (c) means for moving said piston into its said advanced position and for urging said piston with said sealing means into sealing engagement with said slide when said slide is in its advanced position for sealing said pressure chamber with respect to said discharge opening.

2. An apparatus as defined in claim 1, wherein said piston has a workface exposed to said fluid pressure and wherein said means for moving said piston is constituted by said pressurizing means.

3. An apparatus as defined in claim 1, wherein said means defining said pressure chamber includes an intermediate plate having a central opening accommodating said piston.

4. An apparatus as defined in claim 3, wherein wall portions of said intermediate plate defining said central opening and outer peripheral portions of said piston together define an annular chamber and wherein said pressurizing means includes an inlet port for introducing pressurizing fluid into said annular chamber.

5. An apparatus as defined in claim 4, wherein said inlet port is provided in said intermediate plate.

6. An apparatus as defined in claim 3, wherein said piston and wall portions of said intermediate plate define an annular space accommodating an additional sealing means pressed by said piston against said intermediate plate in the advanced position of said piston.

7. An apparatus as defined in claim 6, wherein said piston further has a recessed radial workface oriented away from said discharge opening and being axially spaced from said annular space; and wherein said workface is directly exposed to said fluid pressure and has a radially measured width that is greater than the radially measured width of said annular space; said means for moving said piston being constituted by said pressurizing means.

* * * * *